United States Patent
Hooks (10) Patent No.: US 7,085,996 B2
(45) Date of Patent: Aug. 1, 2006

(54) APPARATUS AND METHOD FOR SOURCE COMPRESSION AND COMPARISON

(75) Inventor: Charles Gordon Hooks, Austin, TX (US)

(73) Assignee: International Business Corporation, Armonk, NY (US)

( * ) Notice: Subject to any disclaimer, the term of this patent is extended or adjusted under 35 U.S.C. 154(b) by 580 days.

(21) Appl. No.: 09/981,882

(22) Filed: Oct. 18, 2001

(65) Prior Publication Data

US 2003/0079174 A1 Apr. 24, 2003

(51) Int. Cl.
*G06F 17/18* (2006.01)

(52) U.S. Cl. .................... 715/500.1; 715/511; 707/203

(58) Field of Classification Search ............. 715/500.1, 715/511; 717/106, 122, 170; 341/50, 51, 341/59; 707/203
See application file for complete search history.

(56) References Cited

U.S. PATENT DOCUMENTS

| | | | | |
|---|---|---|---|---|
| 4,807,182 A | | 2/1989 | Queen ........................ 364/900 |
| 5,532,694 A | | 7/1996 | Mayers et al. ................ 341/67 |
| 5,608,396 A | * | 3/1997 | Cheng et al. ................. 341/50 |
| 5,629,695 A | * | 5/1997 | Watts et al. .................. 341/51 |
| 5,765,513 A | * | 6/1998 | Diehl et al. ............... 123/90.11 |
| RE35,861 E | * | 7/1998 | Queen ........................ 715/511 |
| 5,903,230 A | * | 5/1999 | Masenas ...................... 341/51 |
| 6,098,071 A | | 8/2000 | Aoyama et al. ............ 707/102 |
| 6,321,378 B1 | * | 11/2001 | Weber ........................ 717/122 |
| 6,400,286 B1 | * | 6/2002 | Cooper ........................ 341/51 |
| 6,496,974 B1 | * | 12/2002 | Sliger et al. ................ 717/106 |
| 6,560,620 B1 | * | 5/2003 | Ching ........................ 715/511 |
| 6,570,511 B1 | * | 5/2003 | Cooper ........................ 341/59 |
| 6,625,671 B1 | * | 9/2003 | Collette et al. ............... 710/52 |
| 6,757,893 B1 | * | 6/2004 | Haikin ....................... 717/170 |
| 6,848,078 B1 | * | 1/2005 | Birsan et al. ............... 715/511 |
| 6,954,747 B1 | * | 10/2005 | Wang et al. .................. 706/54 |

* cited by examiner

*Primary Examiner*—Sanjiv Shah
(74) *Attorney, Agent, or Firm*—David A. Mims, Jr.; Rudolf O. Siegesmund (57) ABSTRACT

An apparatus and method is disclosed that configures two files for more rapid comparison by removing blank spaces from the code of all of the lines in each of the files to be compared and also by attaching a control to the beginning of each line of code in each of the two sources prior to be compared. After blank spaces are removed and the controls attached, the two files are compared to determine additions, deletions and changes. The program continues to compare the strings of identical length until all of the strings have been compared. By comparing only strings of identical length, the program is able to compare two sources in substantially less time than by using conventional means of comparison.

5 Claims, 5 Drawing Sheets

(positions: 1 5 9 13 17 21 25 29 31 35 39 43 47 51 55 59 63 67 71 75 79 83 87, marker 520)

FIG. 5B

| 17 | 21 | 25 |
|---|---|---|
| 4 | 4 | 2 |
| 5 | 6 | 7 |

FIG. 5C

| 45 | 49 | 53 | 61 |
|---|---|---|---|
| 4 | 4 | 4 | 3 |
| 12 | 13 | 14 | 15 |

FIG. 5D

| 77 | 81 | 85 |
|---|---|---|
| 4 | 4 | 2 |
| 20 | 21 | 22 |

FIG. 5E

| L | FP | LP |
|---|---|---|
| 10 | 1 | 16 |
| 15 | 8 | 8 |

FIG. 7

APPARATUS AND METHOD FOR SOURCE COMPRESSION AND COMPARISON

FIELD OF INVENTION

The present invention relates to a computer program for improving the speed of comparing multiple lines of source code or text.

BACKGROUND

When comparing two sources of codes or text, the comparison process may be slow and inefficient, particularly when the files to be compared are very large. For example, some conventional comparison programs may take as much as sixteen hours to completely compare two sources. Therefore, a need exists for an apparatus and method which will reduce the time required to complete the comparison of two sources of code or text.

SUMMARY

An invention, which meets the needs stated above, is an apparatus and method that configures two files for more rapid comparison by removing blank spaces from the code of all of the lines in each of the files to be compared and also by attaching a control to the beginning of each line of code in each of the two sources prior to being compared. After blank spaces are removed and the controls attached, the two files are compared to determine additions, deletions and changes. The program continues to compare the strings of identical length until all of the strings have been compared. By comparing only strings of identical length, the program is able to compare two sources in substantially less time than by using conventional means of comparison.

DESCRIPTION OF PREFERRED EMBODIMENTS

Figure 1:
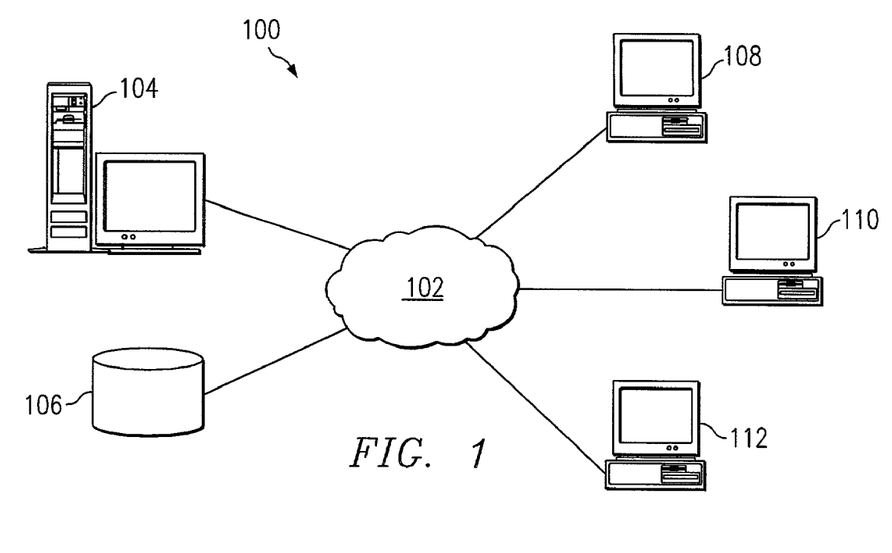
FIG. 1 is depiction of a distributed data processing system.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
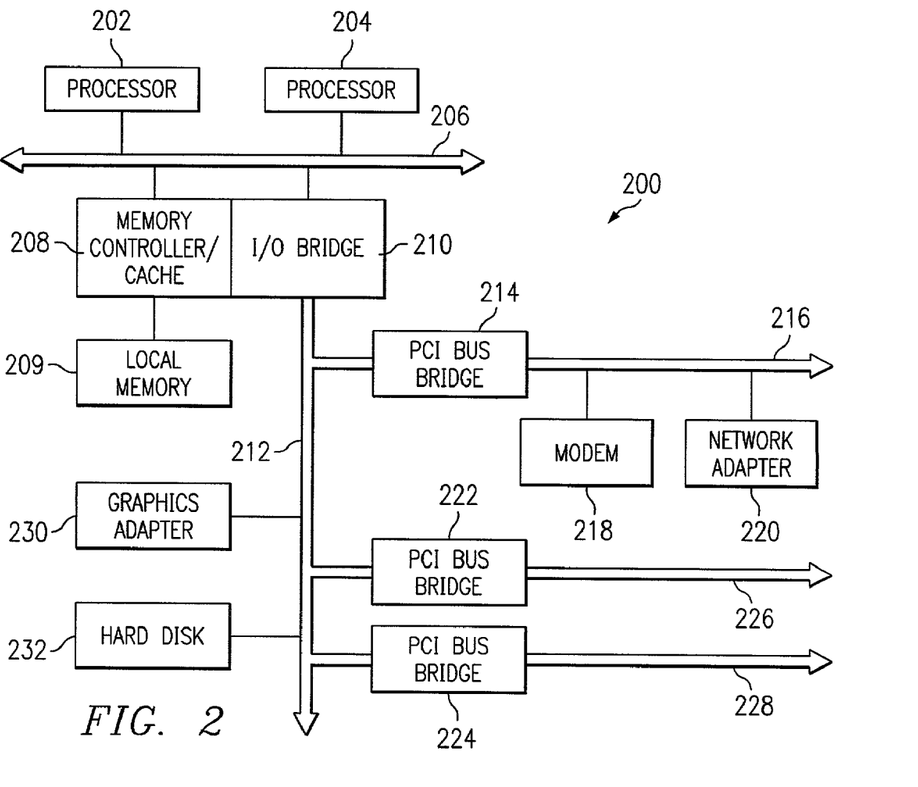
FIG. 2 is a depiction of a server computer.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI bus local 216. Typical PCI bus implementations will support four PCI expansion slots or add-in connectors. Communications links to network computers 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
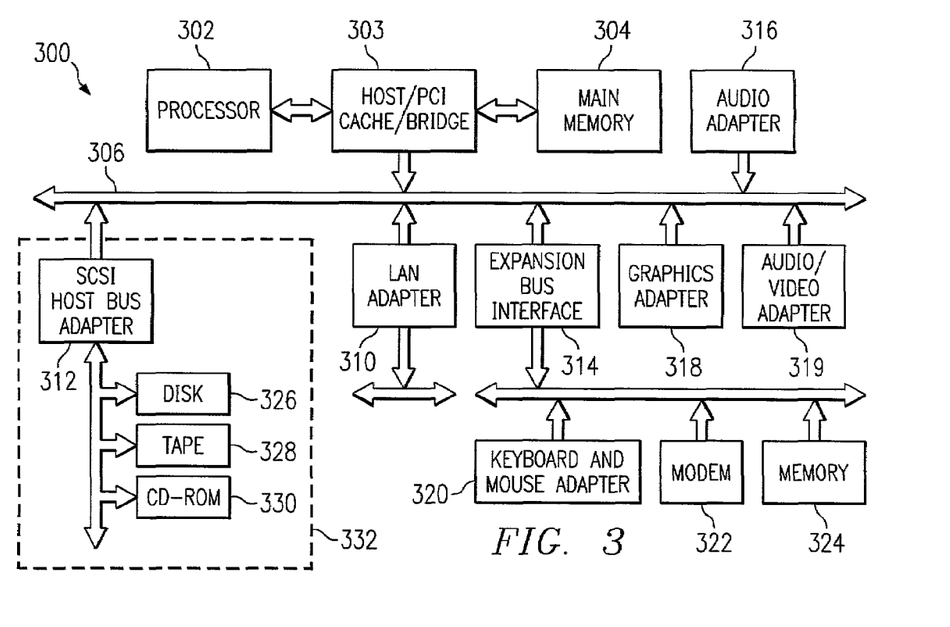
FIG. 3 is a depiction of a client computer.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4A:
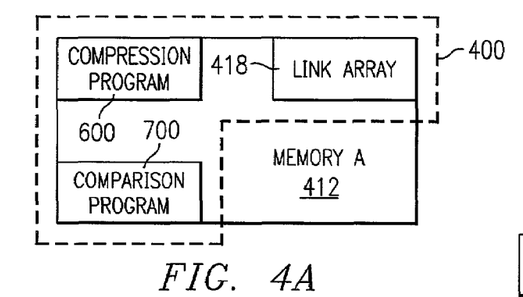
FIG. 4A depicts the compressions and comparison program in memory A.
Figure 4B:
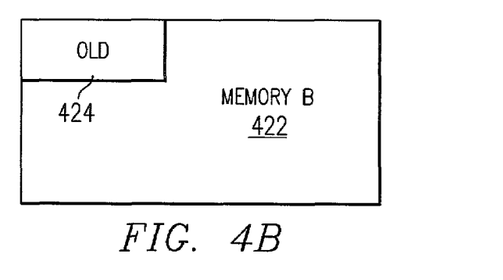
FIG. 4B depicts memory B.
Figure 4C:
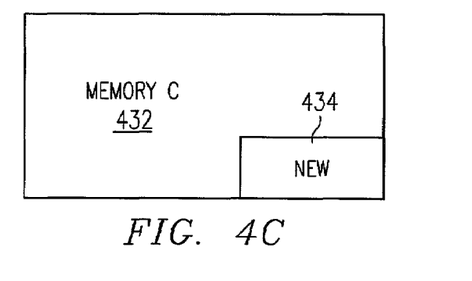
FIG. 4C depicts memory C.

FIG. 4A depicts Compression and Comparison Program (CCP) 400 in memory A (412). CCP 400 has compression program 600, comparison program 700 and link array 418. Memory A (412) may be located in a stand alone computer such as data processing system 300 of FIG. 3 or in a server computer such as data processing system 200 of FIG. 2. FIG. 4B depicts memory B (422) containing old file 424. FIG. 4C depicts memory C containing new file 434. By way of example, CCP 400, old file 424 and new file 434 are shown located in three different memories. However, CCP 400, old file 424 and new file 434 could be located in the memory of a single computer or located in any combination of memories and computers linked together by a local area network or the Internet.

Figure 5A:
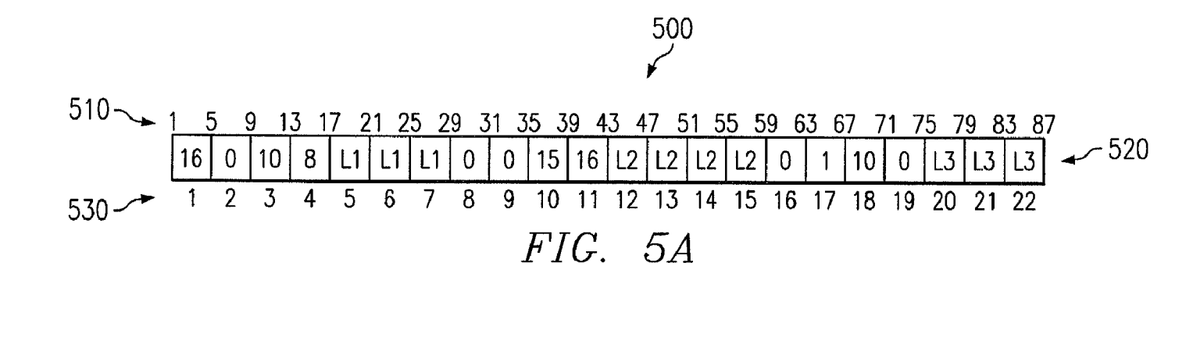
FIG. 5A depicts a compressed string created by the compression program.

FIG. 5A depicts a compressed string 500 created by compression program 600. Compression program 600 will configure old file 424 and new file 434 for comparison by comparison program 700. As used herein the term compressed string means an array of four byte storage cells that contain all the lines of code from a file in a continuous series of words, with all spaces removed from the lines of code except for code within quotation marks, and that includes four control words preceeding each line of code. As used herein the term control word means information including but not limited to pointers and line length created by compression program 600 used to link lines of code of the same length and to facilitate processing by comparison program 700. As used herein the term pointer means the unique number designating the location of a word in the compressed string. A Forward Pointer (FP) and a Backward Pointer (BP) are used in link array 418 to point to the first and last lines of code of the same length respectively.

Compressed string 500 may be more fully understood by reference to character locations 510 word contents 520 and pointers 530. Word contents 520 are displayed within the storage cells of FIG. 5A and represent information contained within a series of four byte control words in storage cells for each line of source. Displayed beneath each four byte word are pointers 530 which are unique sequential numbers designating the location of each individual word in a compressed string. In other words, each four byte word group in the series is numbered consecutively from first to last so that a particular word in a storage cell can be found by reference to the corresponding pointer. Displayed above each four byte word is a series of numbers which represent the cumulative character locations within compressed string 500. For example, the first storage cell begins with number 1 and the second storage cell begins with number 5 representing the four byte storage cell depicted by the first box. Each succeeding box adds four bytes to the cumulative total.

Word contents 520 contains control words and lines. As used herein, a line is a four byte grouping of characters from a sentence from a file that has been compressed. Each line is preceeded by four control words that are placed before the line by compression program 600. Each four word group of control words consists of a first control word, a second control word, a third control word and a fourth control word. As used herein the term first control word means the number of the pointer for the next line of the same length as the line to which the first control word is attached. The second control word means the number of the pointer to the previous line of the same length. The third control word means the number representing the length of the line in characters. The fourth control word means the number of the pointer to the next consecutive line.

In FIG. 5A, by way of example, three lines of code are shown. The first line, L1 is stored in storage cells represented by pointers 5, 6 and 7. The second line is stored in storage cells represented by pointers 12, 13, 14 and 15. The third line is stored in storage cells represented by pointers 20, 21 and 22. The first line first control word is located at pointer 1. The first line second control word is located at pointer 2. The first line third control word is located at pointer 3. The first line fourth control word is located at pointer 4. Likewise, the second line first control word is located at pointer 8. The second line second control word is located at pointer 9. The second line third control word is located at pointer 10. The second line fourth control word is located at pointer 11. Finally, for the example of FIG. 5A, the third line first control word is located at pointer 16. The third line second control word is located a pointer 17. The third lien third control word is located at pointer 10. The third line fourth control word is located at pointer 19.

Figure 5B:
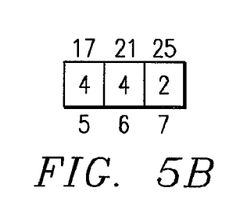
FIG. 5B depicts the character allocation of line L1.

First line third control word located at pointer 3 provides the information that the length of the first line L1 is 10. L1 occupies storage cells identified by pointers 5,6, and 7. Therefore, four characters of L1 will be in the storage cell indicated by pointer 5, four characters of L1 will be in the storage cell indicated by pointer 6 and two characters of L1 will be in the storage cell indicated by pointer 7. The character allocation of line L1 is further shown in FIG. 5B

Figure 5C:
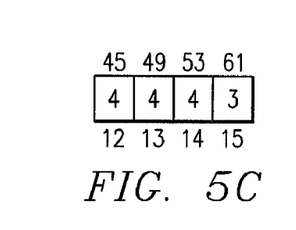
FIG. 5C depicts the character allocation of line L2.

Second line third control word located at pointer 10 provides the information that the length of the second line L2 is 15. L2 occupies storage cells identified by pointers 12, 13, 14 and 15. Therefore, four characters of L2 will be in the storage cell indicated by pointer 12, four characters of L2 will be in the storage cell indicated by pointer 13, four characters of L2 will be in the storage cell indicated by pointer 14 and three characters of L2 will be in the storage cell indicated by pointer 15. The character allocation of line L2 is further shown in FIG. 5C.

Figure 5D:
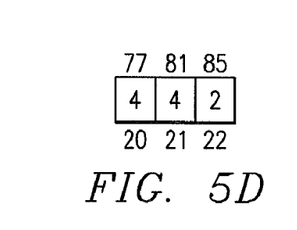
FIG. 5D depicts the character allocation of line L3.

Third line third control word located at pointer 18 provides the information that the length of the third line L32 is 10. L3 occupies storage cells identified by pointers 20, 21 and 22. Therefore, four characters of L3 will be in the storage cell indicated by pointer 20, four characters of L3 will be in the storage cell indicated by pointer 19, four characters of L3 will be in the storage cell indicated by pointer 21 and three characters of L3 will be in the storage cell indicated by pointer 22. The character allocation of line L3 is further shown in FIG. 5D.

First line first control word at pointer 1 contains the information that the next line that contains the same number of characters as line 1 begins at pointer 16. Pointer 16 is the first control word of line 3. Line three has ten characters, the same length as line 1.

Third line second control word at pointer 17 contains the information that the previous line of the same length is found to begin at pointer 1. First line fourth control word at pointer 4 contains the information that the next line begins at pointer 8 which is the location of the second line first control word.

Figure 5E:
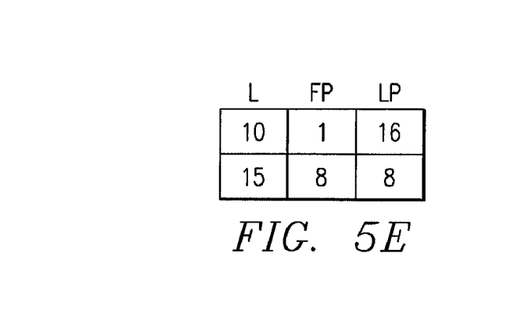
FIG. 5E depicts an exemplary link array.

FIG. 5E shows an example of link array 418. The first row of the link array contains the length of the line, the first pointer for lines of that length and the last pointer for lines of that length. In the example, the FP for lines of length 10 is 1 and the LP for lines of length 10 is 16. The FP for lines of length 15 is 8 and the LP for lines of length 15 is also 8 because there is only one line of length 15.

Figure 6:
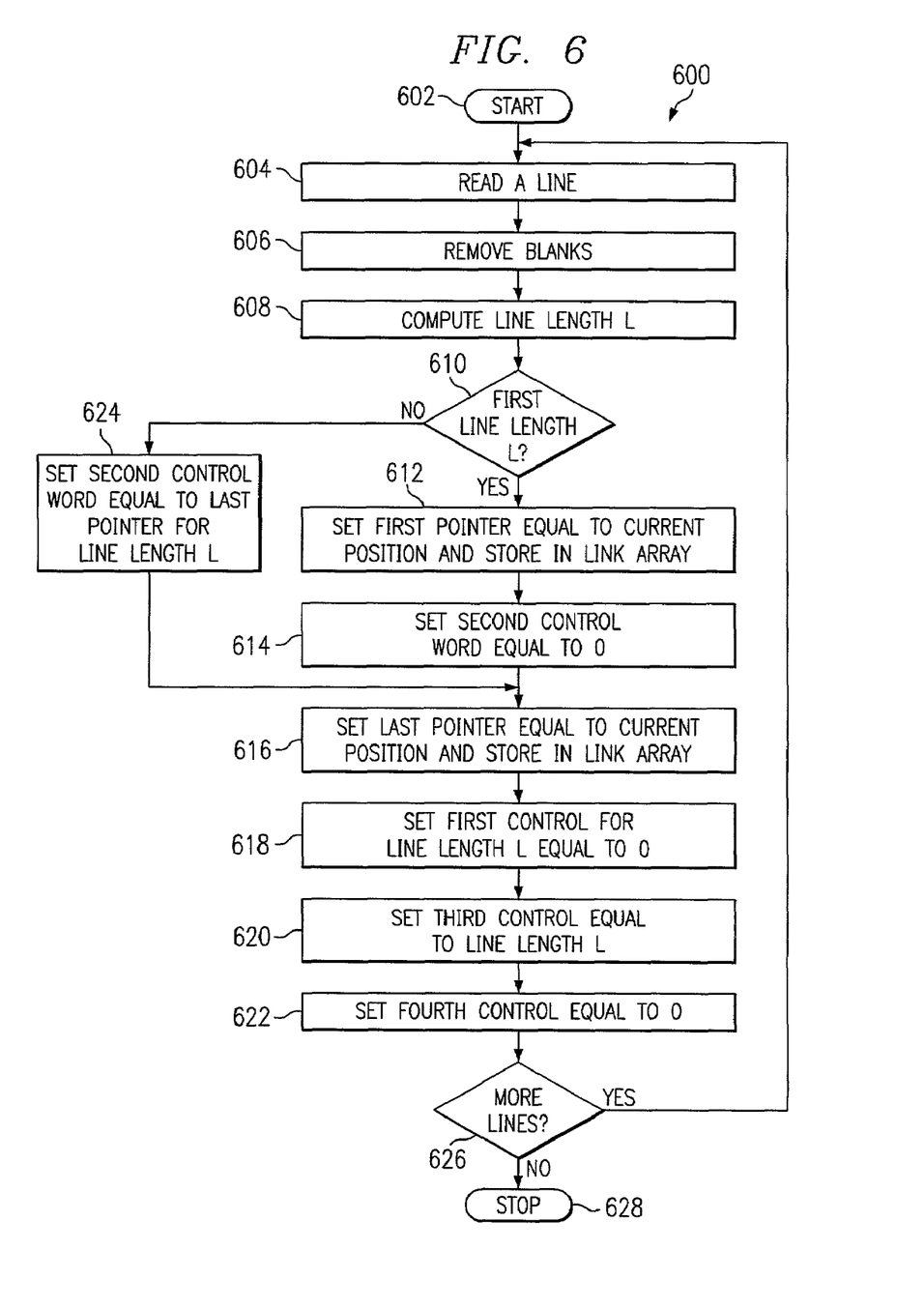
FIG. 6 is a flowchart of the compression program.

FIG. 6 depicts a flow chart for compression program 600. Compression program 600 begins (602) and reads a line (604). All blank spaces are removed from the line except for blanks in quoted strings (606). The length of the line is computed (608). A determination is made whether the line that has been read is the first line of length L (610). If the line that has been read is the first line of length L, then First Pointer for line length L is set equal to the current position and stored in link array 418 (see FIG. 4A). The second control word for the line is set equal to 0 and the program proceeds to step 616. If the line that has been read is not the first line of length L, then the second control word for the line is set equal to the last pointer for a line of length L and the process proceeds to step 616. At step 616, the Last Pointer for line length L is set equal to the current position and stored in link array 418. Next, the first control word for line length L is set equal to 0 (618). The third control is set equal to the line length L (620). The fourth control is set equal to 0. A determination is made whether there a more lines (626). If there are more lines, CP 400 returns to step 602. If there are no more lines, then CP 400 ends. Compression program would be run for both the new and old files.

Figure 7:
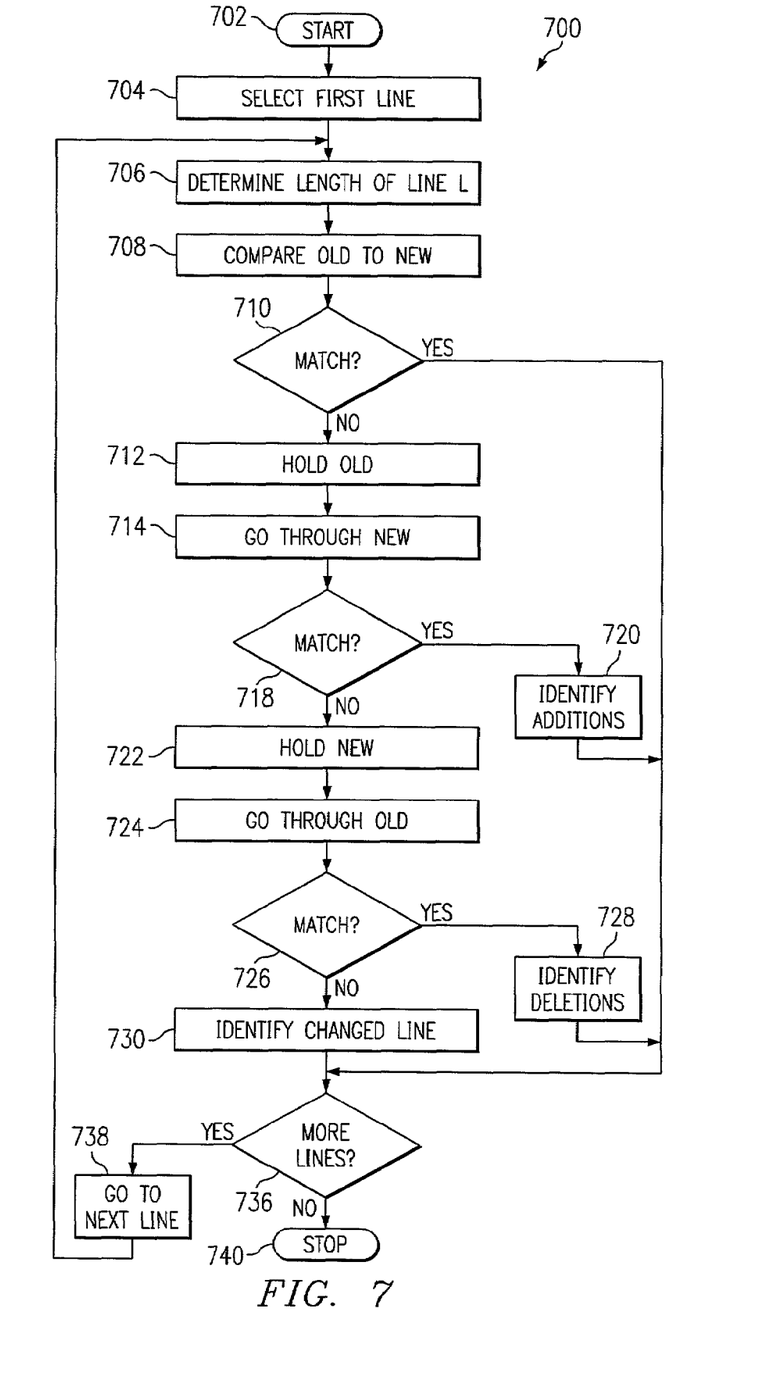
FIG. 7 is a flowchart of the comparison program.

FIG. 7 depicts comparison program 700. Comparison program 700 begins (702). A first line is selected from the old file (704). The length L of the selected line is determined (706). The selected line is compared to the first line of the new file (708). A determination is made as to whether the selected line from the old file matches the selected line from the new file (710). If a match is made, then the program goes to step 736. If the selected line from the old file does not match the selected line from the new file, then the position in the old file is held and the program goes through the new file and examines only the lines of length L (714). A determination is made whether a line of length L matches the selected line from the old file (718). If a match is found, then all of the lines from the first line examined to the matched line are identified as lines that have been added to the new file (720). If a match is not found, then the position of the first line of the new file is held (722) and the program goes through the old file and examines only the lines of length L (724). A determination is made as to whether a match is found (726). If a match is found, then all of the lines in the old file between the first line selected and the matching line are marked as deletions (728). If no matches are found, then the old line is marked as changed to the new line.

At step 736 a determination is made as to whether there are more lines. If there are more lines, then the program goes to the next line (738) and returns to step 706. If there are no more lines, then the program ends (740).

If the First Pointer for length L is zero, then there are no lines of the same length and the search is terminated. If the First Pointer for length L is not zero, then the search starts and the first control word is used to move to each successive line of the same length. When the first control word is zero, then there are no more lines of the same length and the search is terminated.

When a match is made, the position of the match is noted and all lines starting with the initial line where the search started are removed from the storage file and the control words are adjusted for the lines. The First Pointer and the Last Pointer are updated.

A byproduct of compression program 600 is that a line of code in a new listing may have been expanded by placing extra blanks in the line by the programmer for readability. In such a situation, the line of code would not match in a traditional comparison program. However, after the spaces are removed by compression program 600, the old and new lines will still be the same length.

It will be understood from the foregoing that various modifications and changes may be made in the preferred embodiment of the present invention by those skilled in the art without departing from its true spirit. It is intended that this description is for purposes of illustration only and should not be construed in a limiting sense. The scope of the invention should be limited only by the language of the following claims.

What is claimed is:

1. A computer-implemented method of compressing and comparing lines of source data from a new file and an old file comprising:
    removing from each line of source data all blank spaces except for blank spaces within quotation marks;
    computing the length of each line of source data;
    inserting control words into each line of source data; and
    comparing lines of source data in the old file to lines of source data in the new file having equal length to identify modified lines of source data;
    wherein at least one control word is a pointer to another line of source data having the same length;
    wherein at least one control word is the length of the line; and
    wherein the control words determine the order of navigation through the lines of source data so that only lines of source data having the same length are compared.

2. The computer-implemented method of claim 1 further comprising placing each line of source data into four byte storage cells before comparing lines of source data.

3. The computer-implemented method of claim 1 wherein the step of comparing lines of source data comprises:
    selecting a first line in the old file;
    determining the length L of the selected first line;
    comparing the selected first line in the old file to a first line in the new file;
    responsive to determining that the selected line in the old file does not match the first line in the new file, navigating through the new file and comparing only lines in the new file having length L to the selected first line; and
    responsive to determining that a line in the new file matches the selected first line, identifying all of the lines between the first compared line in the new file to the matched line in the new file as lines that have been added to the new file.

4. The computer-implemented method of claim 3 further comprising:
    responsive to determining that no line in the new file matches the selected first line in the old file, selecting a first line in the new file having length L, navigating through the old file and comparing only lines in the old file having length L to the selected first line in the new file; and
    responsive to determining that a line in the old file matches the selected first line in the new file, identifying all of the lines in the old file between the first line selected and the matching line as deletions.

5. The computer-implemented method of claim 4 further comprising, responsive to determining that the no line from the old file matches the selected first line in the new file, identifying selected first line in the new file as changed.

* * * * *

UNITED STATES PATENT AND TRADEMARK OFFICE
CERTIFICATE OF CORRECTION

PATENT NO. : 7,085,996 B2 Page 1 of 1
APPLICATION NO. : 09/981882
DATED : August 1, 2006
INVENTOR(S) : Hooks It is certified that error appears in the above-identified patent and that said Letters Patent is hereby corrected as shown below:

Title Page: Item (73) col. 1 Assignee should be --International Business Machines Corporation--

Signed and Sealed this

Seventh Day of November, 2006

JON W. DUDAS
*Director of the United States Patent and Trademark Office*